United States Patent [19]

Greason et al.

[11] 4,385,209

[45] May 24, 1983

[54] ADJUSTMENT OF OPERATING CHARACTERISTICS OF A TELEPHONE TRANSMITTER INCLUDING AN ELECTRET TRANSDUCER

[75] Inventors: William D. Greason, Dorchester; Beverley W. Gumb, London; Alan C. Busche, Dorchester; Eric Foster, London, all of Canada

[73] Assignee: Northern Telecom Limited, Montreal, Canada

[21] Appl. No.: 211,091

[22] Filed: Nov. 28, 1980

[51] Int. Cl.³ .............................................. H04R 19/04
[52] U.S. Cl. .................................. 179/111 E; 307/400
[58] Field of Search ........................... 179/111 E, 106; 307/400, 304; 330/277

[56] References Cited

U.S. PATENT DOCUMENTS 3,663,768 5/1972 Madsen et al. ................... 179/111 E
3,816,671 6/1974 Fraim et al. ..................... 307/400 X
4,188,513 2/1980 Morrell et al. .................. 179/111 E Primary Examiner—Stafford D. Schreyer
Attorney, Agent, or Firm—Sidney T. Jelly

[57] ABSTRACT

A telephone transmitter including an electret transducer is connected to an electrical circuit mounted in the transmitter housing. A resistor which can be of varying value is also connected to the circuit, the value of the resistor being adjusted to bring the operating characteristics within predetermined values. This is done by applying a sound signal of known frequency to the transducer and measuring the output characteristics of the transducer. This enables the suitable value of resistor to be connected into the circuit. By this means variations arising from varying atmospheric conditions at assembly, and other causes, can be allowed for. The metallized strip or film of the electret is preferably mounted with a very slight Vee shaped formation to avoid tight manufacturing tolerances which occur with a straight, or flat, strip.

10 Claims, 7 Drawing Figures

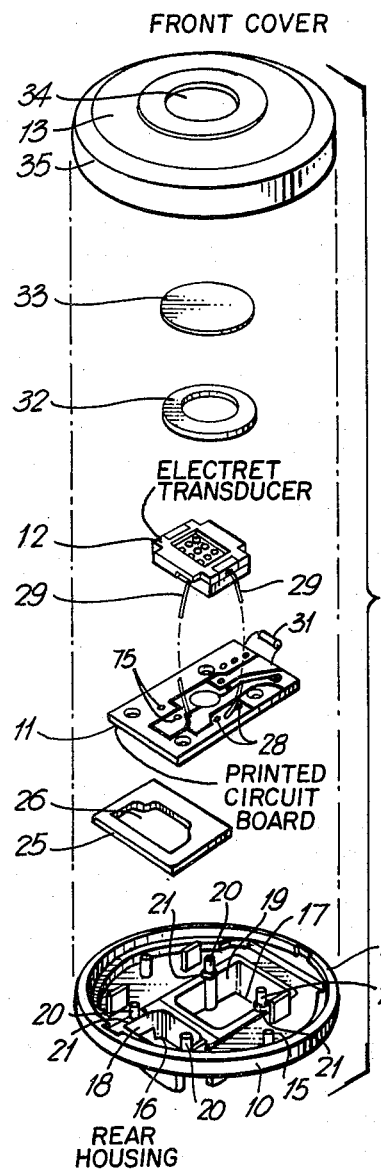
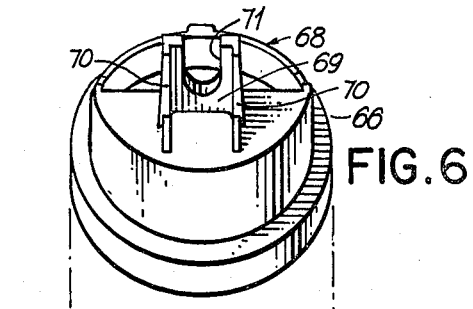
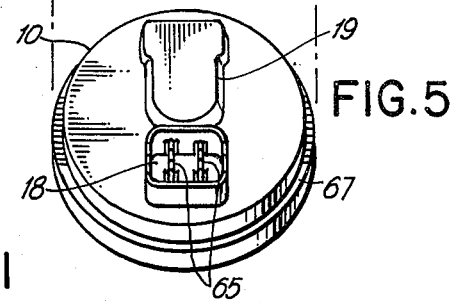
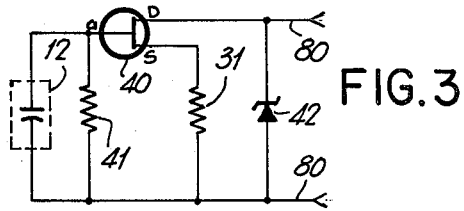
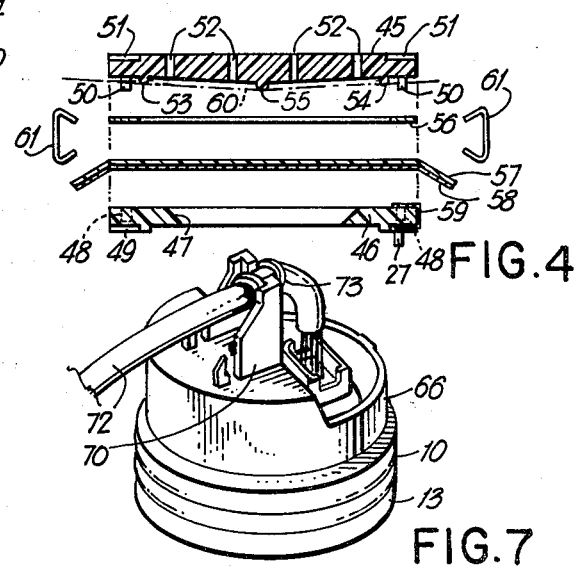

ADJUSTMENT OF OPERATING CHARACTERISTICS OF A TELEPHONE TRANSMITTER INCLUDING AN ELECTRET TRANSDUCER

This invention relates to a telephone transmitter including an electret microphone, or transducer.

Electret microphones are attractive in that they are relatively simple and inexpensive, and suitable for use with solid state circuitry. The heart of an electret microphone is a thin film of flexibly dielectric material, for example "TEFLON", on one surface of which is deposited a very thin conductive layer. The film is stretched over, and spaced a very small distance from, a further conductive film on a support member. The assembly thus acts as a capacitor with a characteristic which varies as the film vibrates, under the effect of noise, for example human speech, impinging on the film.

Problems exist in the manufacture of the electret microphone. The conductive film has to be stretched over the mating member and held firmly. Not only does this create problems during manufacture, in that the film has to be clamped to the other member whilst stretched and then excess material cut off, but variations in humidity at time of manufacture affect the characteristics. This, added to the effects of humidity variation during operation, results in many microphones being rejected as the operating characteristics fall outside the tolerance "envelope" for the operating characteristics.

The present invention provides an improved design for and method of, mounting the electret film on the support and mating structure and also an associated circuit which can be tested, after the microphone has been assembled, to indicate the value of a resistor needed to bring the operating characteristics of the microphone within acceptable limits. By this means, substantially all microphones manufactured are to acceptable standards and the rejection rate is negligable with a substantial reduction in cost.

In the present invention, the electret microphone is assembled, together with its associated solid state circuitry, on a printed circuit board (PCB). The assembly is then tested by the exposure of the electret to a signal of a preset frequency, for example 1000 Hz and the response measured. By use of suitable associated apparatus, an indication is given of a resistor value which should be inserted into the circuitry of the microphone to give the desired response. Thus variations occurring during manufacture, whether due to physical variations, or humidity variations, are corrected for after assembly. As a further feature, the electret film is assembled to the mating part by stretching over in such a way that the film assumes a very shallow Vee formation.

The invention will be readily understood by the following description, of an electret transmitter for a telephone set, by way of example, in conjunction with the accompanying drawings, in which:

FIG. 1 is an exploded perspective view of a transmitter;

FIG. 2 is a perspective view of a transmitter illustrating the assembly of rear housing, printed circuit board and electret;

FIG. 3 is one form of circuit associated with the electret;

FIG. 4 is an exploded cross-section through the electret sub-assembly, greatly enlarged for clarity, generally on the line IV—IV of FIG. 1;

FIG. 5 is a perspective view on the rear of an assembled transmitter;

FIG. 6 is a perspective view of a cap member which fits on the back of a transmitter;

FIG. 7 is a perspective view of an assembled transmitter, cap member and one form of cord.

As illustrated in FIG. 1, a telephone transmitter comprises a rear housing 10, a printed circuit board 11, an electret transducer 12 and a front cover 13. In more detail, the rear housing is circular in plan form with a short forward projecting rim 14 and a rear wall 15. In the rear wall are two recesses 16 and 17, the recess having surrounding walls 18 and 19 extending rearwards from the rear wall. Recess 16 is open at the back, but recess 19 is closed by a rear wall.

Four pins or spigots 20 extend forward from the rear wall 15, two of the spigots having base sections 21 of larger diameter, and the other two pins extend from projections 22 on the rear wall. The PCB 11 fits over the pins 20 and rests on the base section 21 and projections 22. The pins 20 are staked or rivetted over to hold the PCB in place. A seal 25 of resilient material is positioned between one end of the board and the periphery of the aperture 16, there being an aperture 26 in the seal.

The transducer 12 rests on the forward surface of the PCB, being located by two pins, indicated at 27 in FIG. 4, on the rear surface of the transducer assembly, fitting into two holes 28 in the PCB. Electrical leads 29 are soldered to contact areas on the front surface of the PCB and hold the assembly in place. Also mounted on the front face of the PCB is a resistor 31 and there is also a conductive film pattern which interconnects the various electronic components, mounted on the rear surface.

An annular seal 32 rests on the assembly 12 and a polyethylene membrane 33 rests on the seal 32. In the center of the cover 13 is an aperture 34, slightly smaller than the disc 33. Aperture 34 provides for access of sound to the microphone, that is the transducer 12. The cover, conveniently formed from an aluminum alloy, has a rim 35 which fits over the outside of the circumference of the rear housing, with the rim 35 being turned over the rear of the housing to hold the transmitter assembly together. The assembly of rear housing, PCB, and electret is seen in FIG. 2.

FIG. 3 illustrates one form of circuit associated with the transducer 12, the transducer indicated by the dotted outline. Included in the circuit is a "FET" (a Field Effect Transistor) 40, a first resistor 41, diode 42, and a further resistor, which is the resistor 31 in FIG. 1. Resistor 31 is the resistor the value of which is determined after manufacture of the transducer and attachment thereof to the PCB. Thus in FIG. 2, resistor 31 is not shown as this view is prior to testing.

FIG. 4 illustrates in more detail, and to a much larger scale, the construction of the transducer, or microphone 12. Generally, the assembly comprises two plastic moldings 45 and 46, forming front and back members. In the back member 46 is a rectangular aperture 47 and at one end are the two locating pins 27. In the front surface of the back member are two small holes or recesses 48 at one side. The ends of the member are recessed, at 49, in the back surface.

The front member 45 has two pins 50 on a rear surface, the pins fitting in the holes 48. Recesses 51 are formed on the back surface and a number of holes or apertures 52 are formed through the member. The back surface of the front member 45 is of a shallow Vee shaped formation, being inclined downwards towards the center. Formed on this back surface are three transverse ribs 53, 54 and 55. Ribs 53 and 54 are spaced a short distance in from the ends of the front member and rib 55 is at the center, at the open of the shallow Vee formation. The ribs are substantially the same height but the inclination of the back surface, because of the shallow Vee formation, causes the surface of the center rib 55 to be slightly higher, for example 0.0015 inches higher than the surfaces of the ribs 53 and 54. Extending over the back surface is a length of Teflon tape or film 57, metallized on the rear surface, as indicated at 58. This arrangement gives a bowing of the tape 57, as indicated by the chain dotted line 60. Effectively there are formed two capacitors in series, between rib 53 and rib 55 and between rib 54 and rib 55. The arrangement of the shallow Vee formation of the back surface avoids manufacturing problems, particularly in that it is not very essential that the height of the ribs 53, 54 and 55 relative to the surface, be identical. If the ribs did vary in height, on a flat back surface, it could be that the tape, or film, would not be in contact with the center rib, with variation in characteristics. Also variations in tension of the tape after manufacture, due to variations in humidity at time of assembly, for example, will not create any substantial changes in characteristics.

The tape or film 57 is positioned between the front and back members 45 and 46, as seen in FIG. 4. A paper gasket 56 is positioned between the tape 57 and the front member 45. To assemble, the tape 57 is stretched over the back member 46, the gasket 56 and the front member 45 positioned on top, located by pins 53. The assembly is gripped and the tape 57 cut so that the ends of the tape extend down the ends of the back member. A small length of aluminum foil 59 extends round one end of the back member 46, one end of the foil positioned in a recess 49, the other end extending over the front surface of the back member. This foil 59 therefore makes electrical contact with the metallized layer or surface 58 of the tape. The spring clips 61 are pushed on, the clips resting in the recesses 49 and 51. The clips 61 clamp the two members 45 and 46 together. Electrical connection is made to the clip 61 which is in contact with the aluminum foil 59, as indicated at 62 in FIG. 2.

FIG. 5 illustrates the back of the housing 10, when the PCB 11 and electret 12 have been assembled thereto. The electronic devices, that is the FET 40, resistor 41 an diode 42, are mounted on the rear of the PCB such that they fit in the recess 17. Also mounted on the rear of the PCB, and connected to the conductor pattern on the front of the PCB, are two terminals 65 positioned so that they are accessible through the open end of recess 18. The terminals 65 are double sided, each terminal accepting two spade-type terminals on the telephone handset cord. The ends of the terminals 65 pass through holes 75 in the PCB 11 and are soldered to the circuit pattern on the PCB. This is indicated at 76 in FIG. 2. Also seen in FIG. 2 are positions, indicated at 77, where leads from the resistor 41, FET 40, and diode 42 pass through the PCB and are soldered to the circuit pattern. FIG. 6 illustrates a cap member 66, of molded plastic material, which fits on to the rear of the housing 10. The rim 14 of the housing 10 is recessed, as seen at 67 both for the turning over of the rim 35 of the front cover 13, and to provide a location diameter for the cap member 66. A generally channel shaped extension 68 is formed on the back of the cap member, having a web 69 and two flanges 70. A slot 71 is formed in the web 69.

The extension 68 can be used in two ways. For a handset cord which is wired direct to the transmitter, the cord rests in the slot 71, near its end, and the conductors, with spade-type terminals at their ends, connected to the terminals 65. Alternatively a modular jack can be positioned in the channel defined by the web and flanges with conductors from the jack having spade-type terminals connected to the terminals 65. When the transmitter is assembled into the handset, the handset cord is then connected by insertion of a modular plug, through an aperture in the end of the handset, into the modular jack. FIG. 7 illustrates the arrangement for a handset cord, 72, which is directly connected to the terminals 65. A strain relief 73, attached to the cord 72, is also located in the slot 71.

The transmitter is assembled to the condition as illustrated in FIG. 2. The transmitter is then exposed, from the front, to a sound signal of predetermined frequency, for example 1000 Hz. The response to this frequency is measured via output leads attached to the terminals 65. Terminals 65 connect to the conductors 80 in FIG. 3. By passing the response signal into a comparator circuit, an indication is given of the value required for the resistor 31, to bring the response within the tolerance envelope. This resistor can be of varying value, between for example 510Ω and 3900Ω. A resistor of the required value, or very close thereto, is then soldered to the circuit pattern, as indicated by resistor 31 in FIG. 1, and the transmitter is now acceptable. It is known that if the electret is tested at one frequency, for example 1000 Hz, and the associated circuit connected by resistor 31 to bring the response within acceptable limits, then the response at other frequencies will also be within acceptable limits.

The various items can easily be assembled, and the effect of assembly conditions negated by the ability to adjust the circuitry after assembly. The use of the quick-clip terminals 65 provides for quick and easy connection to the PCB 11, and allows either direct wiring and connection of a line cord or the use of a modular jack and plug form of connection.

It has been found that reversal of the electrical connections to the transducer 12, relative to the connections as shown in FIG. 3, can reduce noise in the transmitter.

What is claimed is:

1. A telephone transmitter including an electret transducer, comprising:
   a rear housing;
   a front cover attached to said rear housing and defining therewith a chamber;
   a printed circuit board mounted in said chamber;
   an electret transducer mounted on said printed circuit board, between said cover and said board;
   an aperture in said cover in alignment with said transducer;
   an electrical circuit on said printed circuit board, said electret transducer forming part of said circuit, said circuit including a first resistor of a predetermined value and a second resistor having a value selected after subjection of the electret transducer to a test signal, to bring the operating characteristics of the transmitter within predetermined limits.

2. A transmitter as claimed in claim 1, said rear housing having an enclosed recess extending from an inner rear surface, said printed circuit board including electronic devices mounted on a rear surface of the printed circuit board and housed within said recess, said transducer mounted on a front surface of said printed circuit board.

3. A transmitter as claimed in claim 2, said printed circuit board including a conductive pattern on said front surface, said devices connected to said pattern through said board, said resistor mounted on said front surface.

4. A transmitter as claimed in claim 2 said rear housing having an open recess extending outward from said inner rear surface, a seal member positioned on said inner rear surface of the rear housing and extending around said open recess, said printed circuit board mounted on said seal to close said open recess from said chamber, and terminals positioned in said recess and connected to said electrical circuit.

5. A transmitter as claimed in claim 4, including a cap member attached to an outer rear surface of said rear housing, said cap member including an aperture for access to said terminals.

6. A transmitter as claimed in claim 5, including an extension on an outer rear surface of said cap member for alternatively receiving a modular jack or a strain relief member of a line cord.

7. A transmitter as claimed in claim 1, including pins extending forward from a front surface of said rear housing, said printed circuit board positioned on said pins, said pins deformed at their ends to clamp said board to said rear housing.

8. A transmitter as claimed in claim 1, said transducer comprising a front member, a back member and a length of metallized flexible dielectric tape clamped between the front and back members, the tape having a metallized surface, the metallized surface of the tape on the side adjacent to the back member, said back member of rectangular form and having a rectangular aperture therein;

said front member of rectangular form and having a back surface opposed to said back member, said back surface inclined rearwardly from each end to form a shallow Vee shaped formation, a transverse rib extending across said back surface adjacent to each end and a further transverse rib extending across said back surface at a center position between said ends, said ribs of substantially the same height from the back surface, whereby said metallized tape assumes a shallow Vee shaped formation;

a non conducting gasket between said metallized tape and said front member;

said front member including a plurality of apertures therethrough;

a clip at each end of said transducer, said clips clamping the front and back members together;

a conductive strip extending over one end of said back member, said metallized surface of said tape in contact with said conductive strip, one of said clips contacting said conductive strip, electrical contact being made to said one clip to connect said metallized strip to said circuit as one member of a capacitor, a conductive pattern on a front surface of said printed circuit board forming the other member of said capacitor.

9. A method of assembling a telephone transmitter including an electret transducer, comprising:

providing a rear housing;

mounting a printed circuit board on said rear housing, said printed circuit board having an electrical circuit thereon comprising an electrical conductive pattern on one surface of the board and electronic devices connected to the electrical conductive pattern, said circuit having output connections;

mounting an electret transducer on said printed circuit board, and connecting the transducer to said electrical circuit;

applying a sound signal of predetermined frequency to said transducer and measuring output characteristics at said output connections;

determining the value of a resistor for insertion in the electrical circuit to bring said characteristics within a predetermined range; and connecting a resistor of said determined value to said electrical circuit.

10. A method as claimed in claim 9, said transducer being mounted on said printed circuit board prior to mounting said printed circuit board on said rear housing.

* * * * *